Figure 23A:
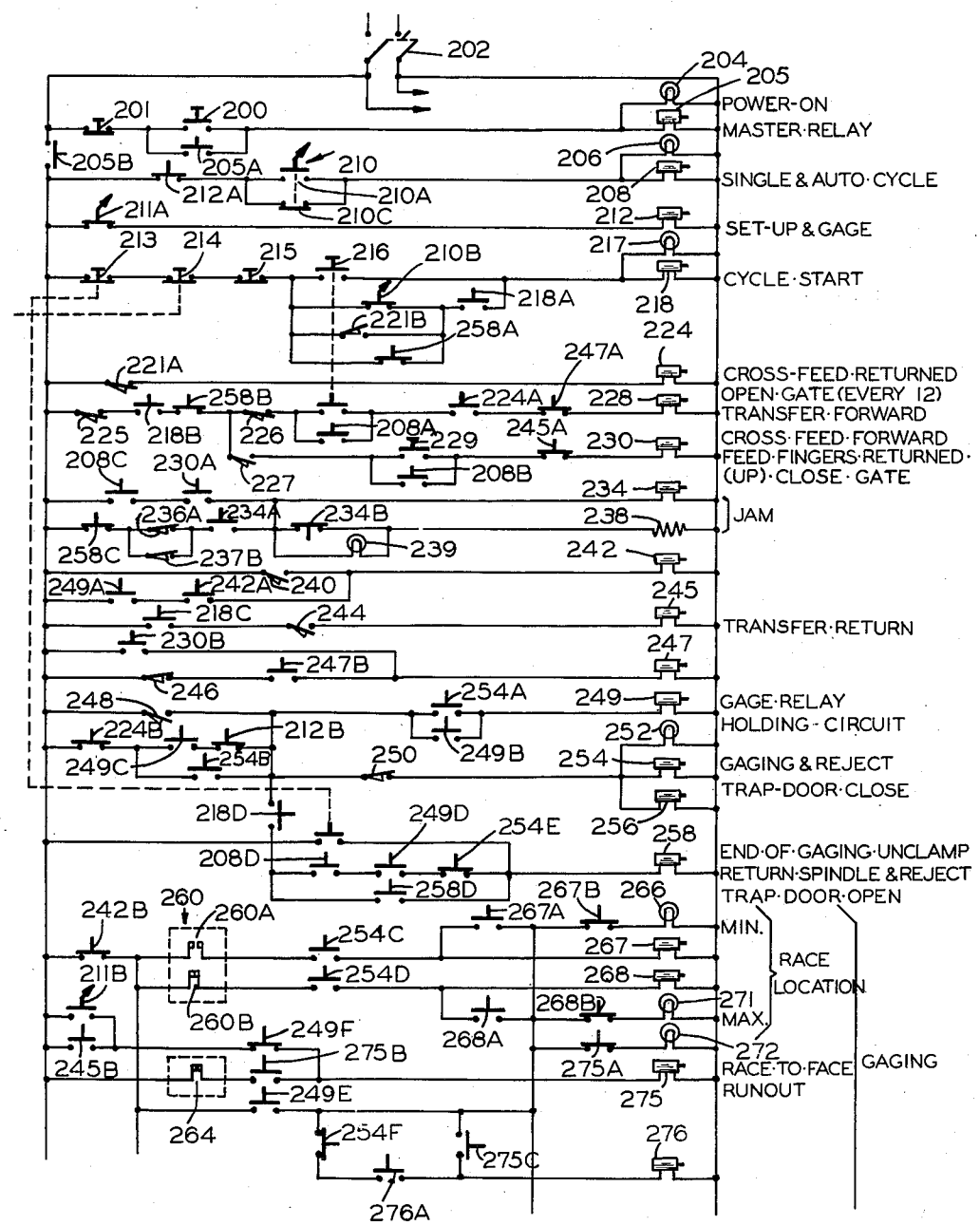

Jan. 3, 1961
R. L. ESKEN
2,966,989
GAGING APPARATUS
Filed Sept. 12, 1955
9 Sheets-Sheet 1
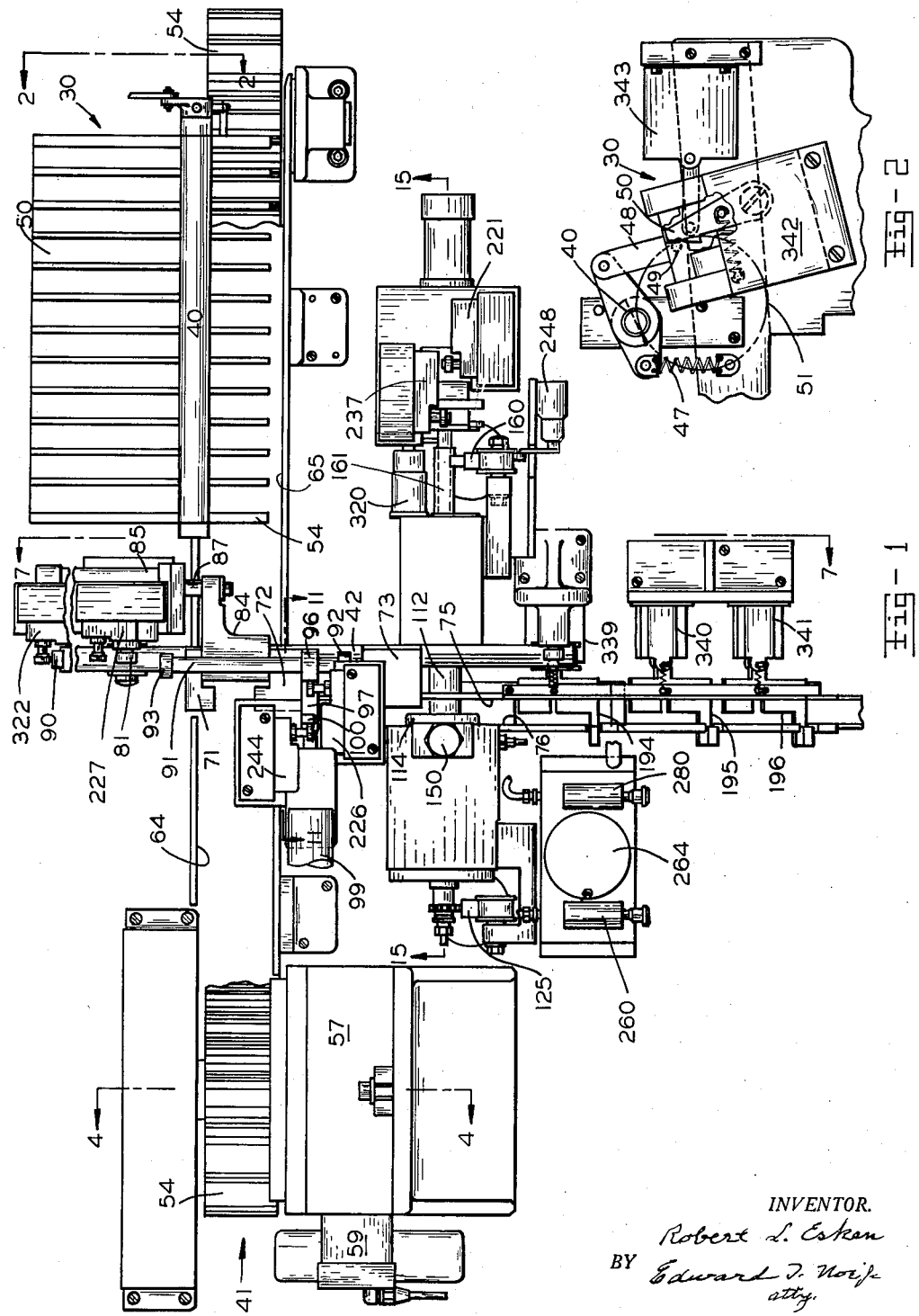
INVENTOR.
Robert L. Esken
BY Edward J. Noie
atty.

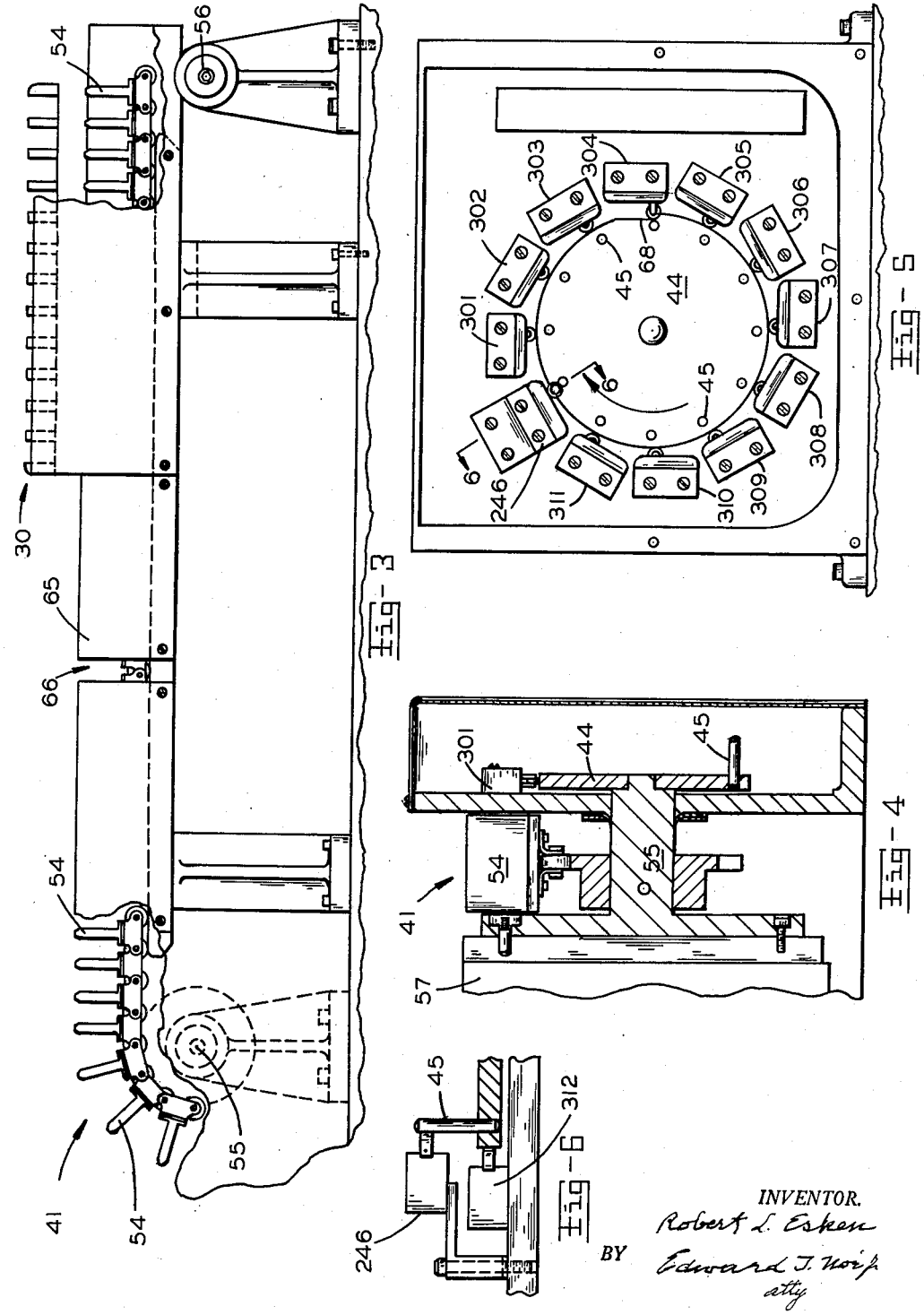

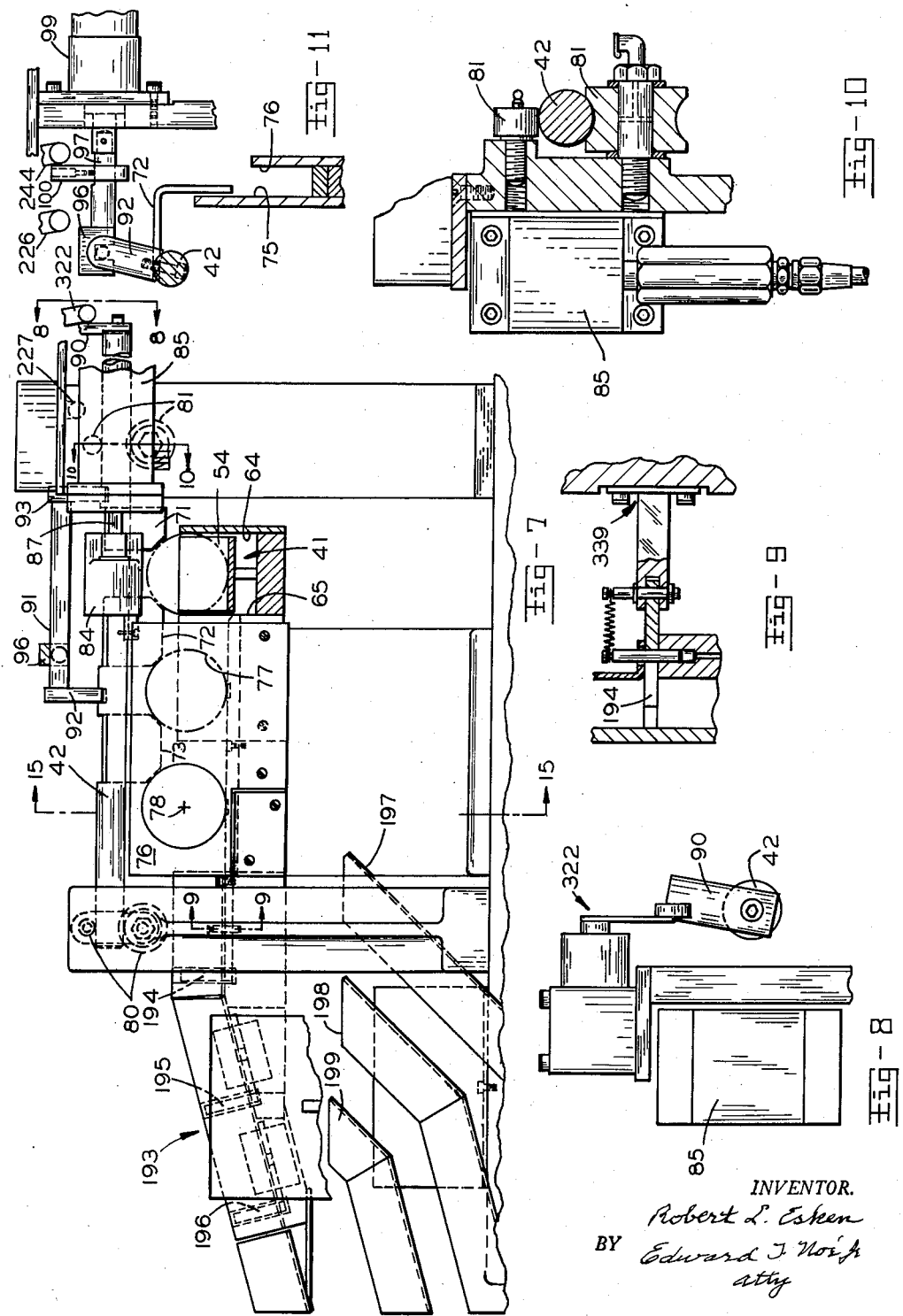

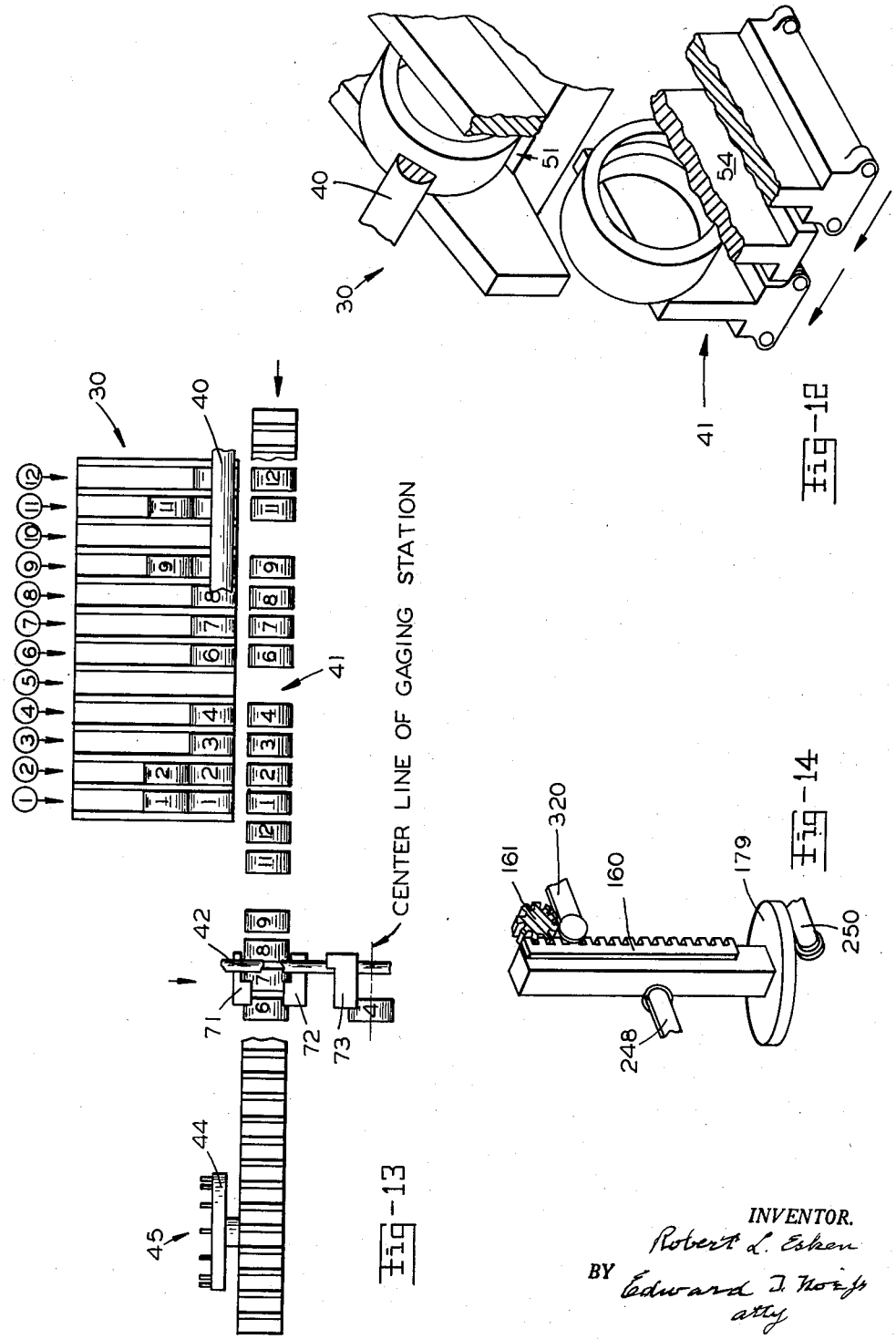

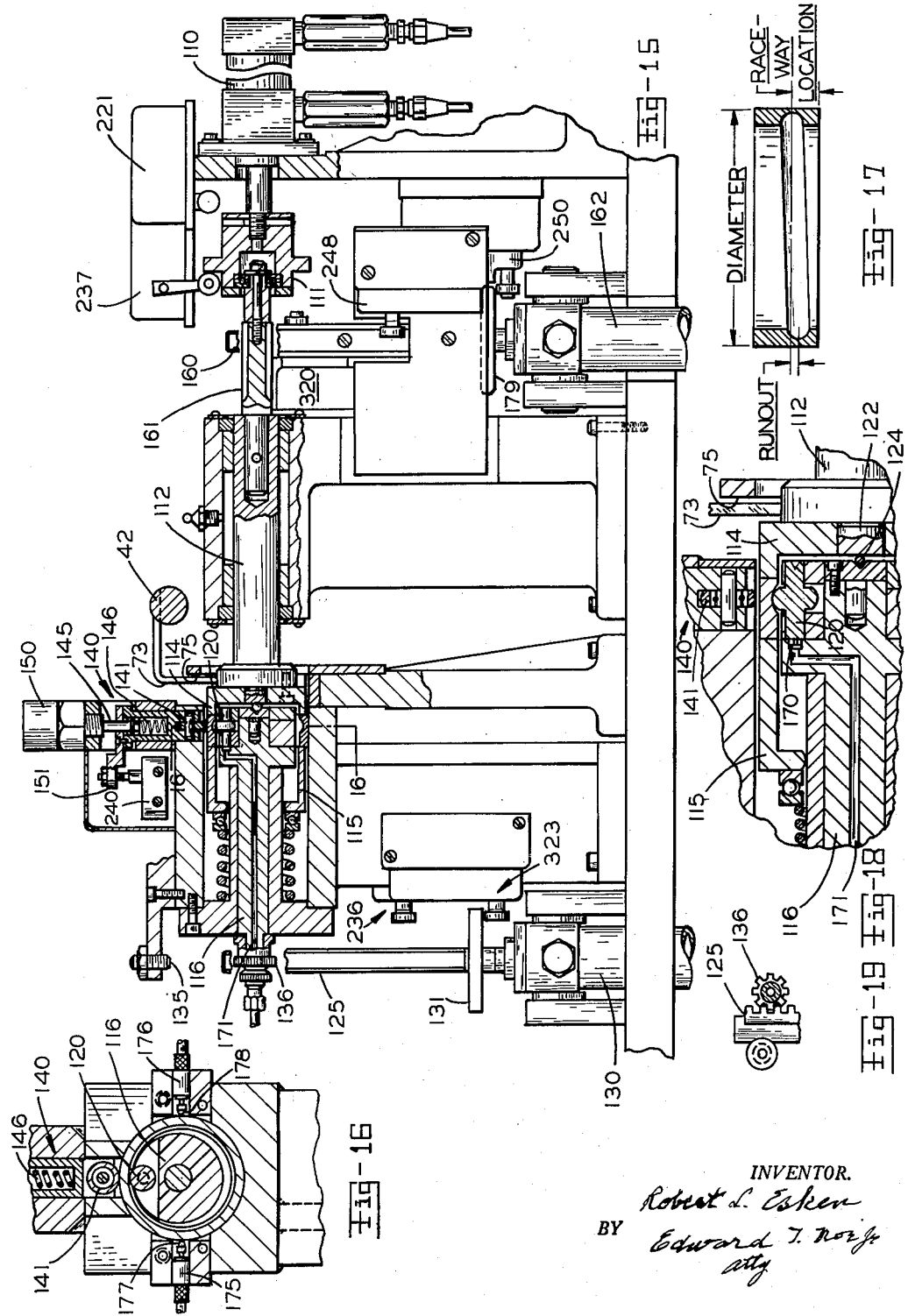

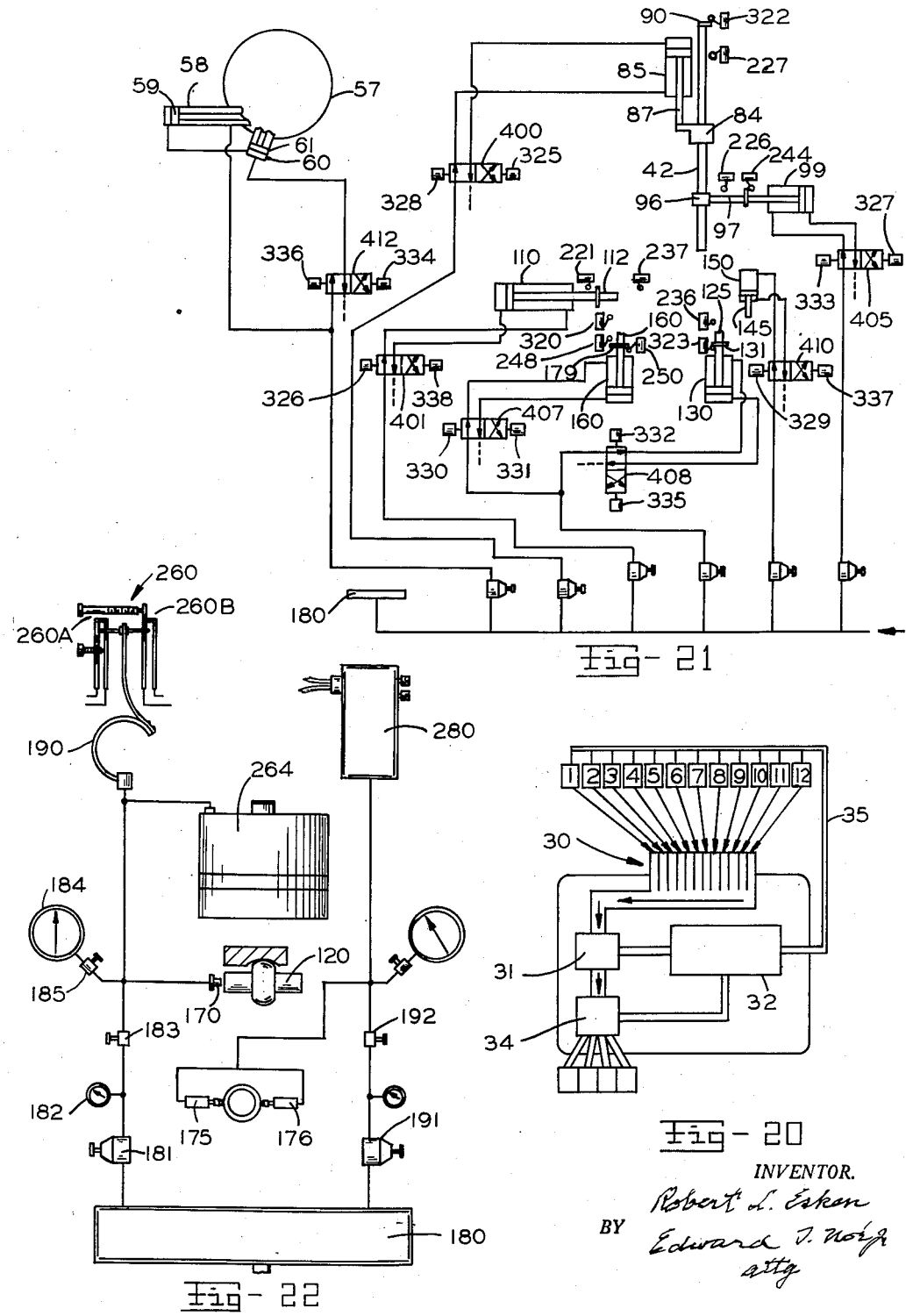

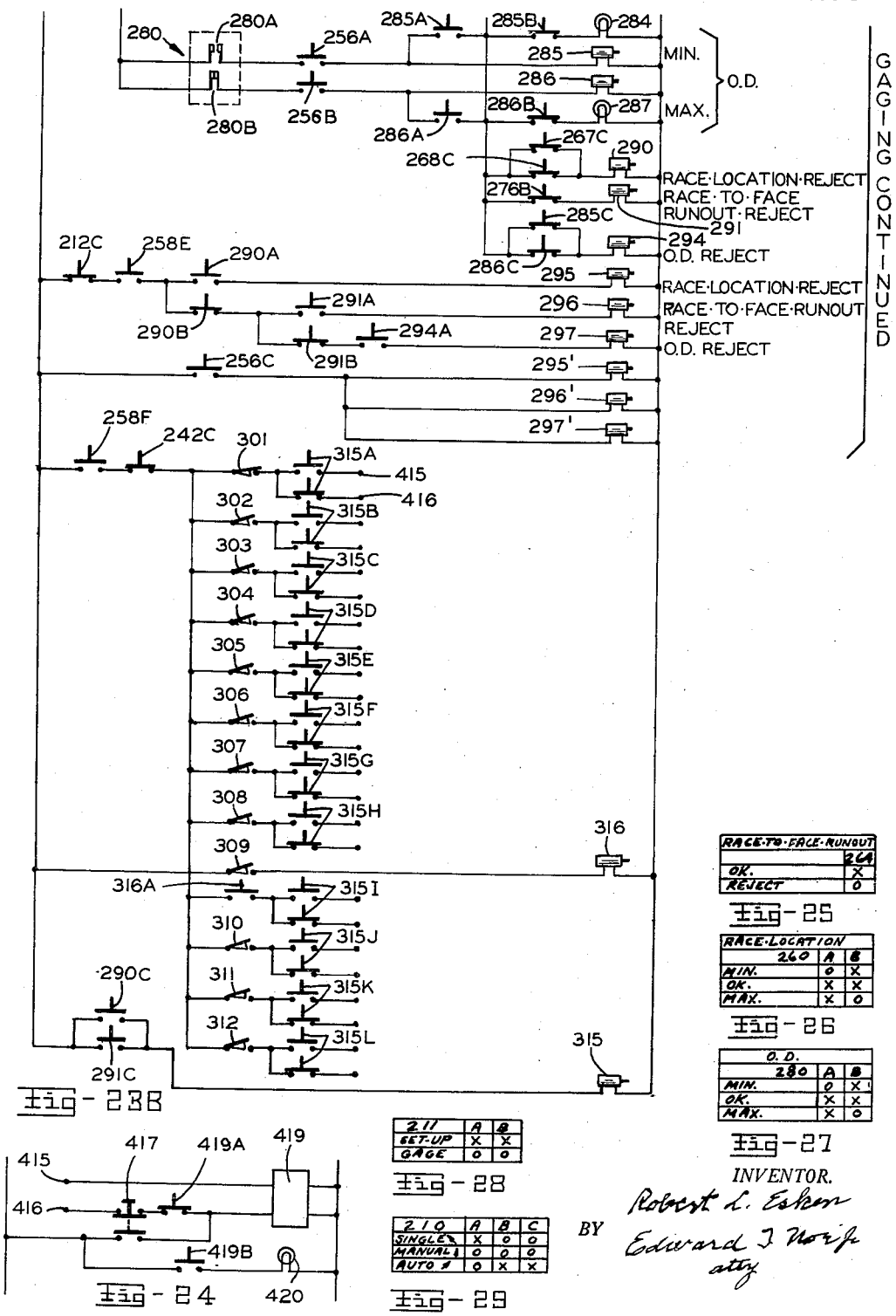

Jan. 3, 1961   R. L. ESKEN   2,966,989
GAGING APPARATUS
Filed Sept. 12, 1955   9 Sheets-Sheet 9
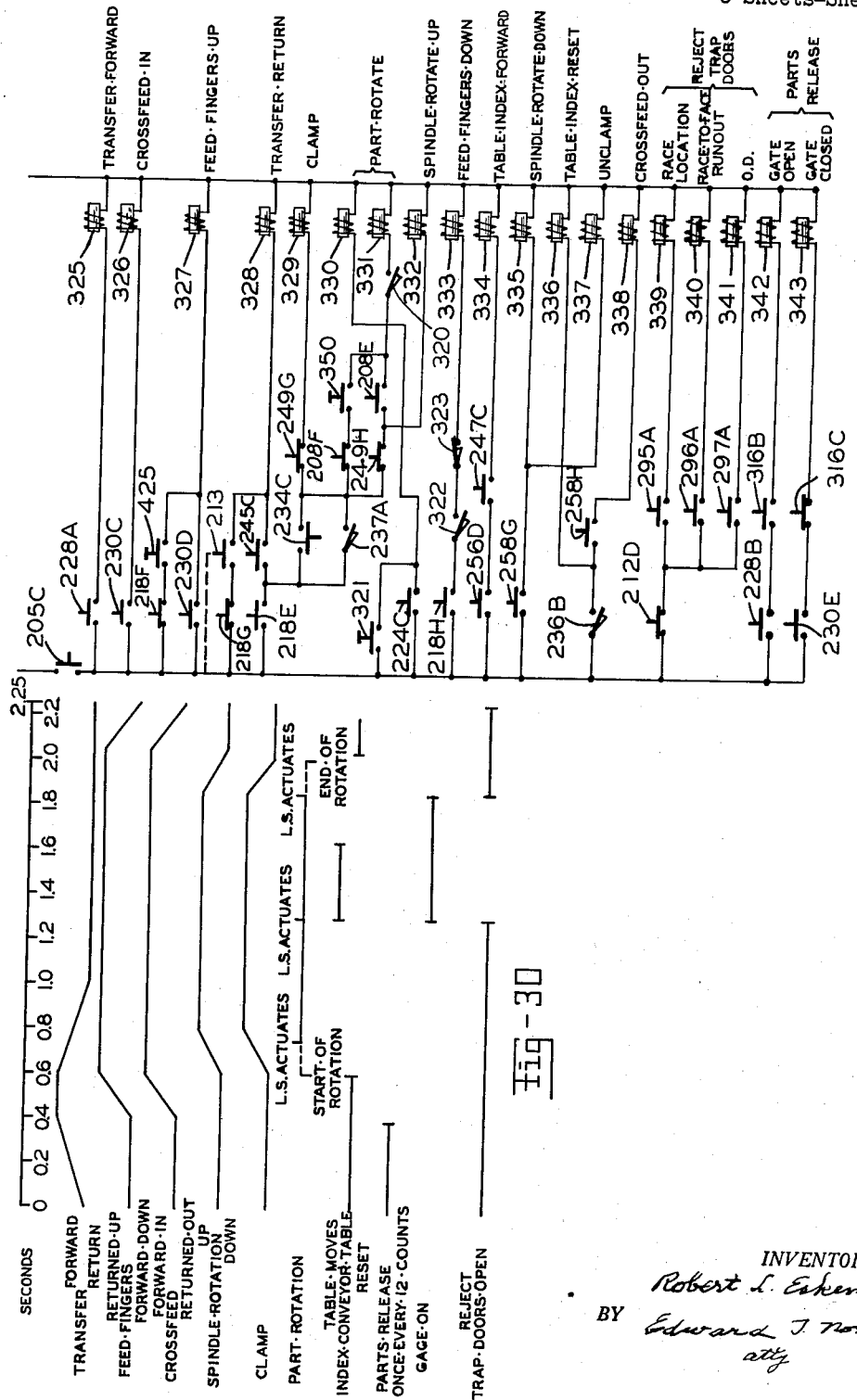

United States Patent Office 2,966,989
Patented Jan. 3, 1961

2,966,989

GAGING APPARATUS

Robert L. Esken, Dayton, Ohio, assignor, by mesne assignments, to The Sheffield Corporation, a corporation of Delaware Filed Sept. 12, 1955, Ser. No. 533,637

15 Claims. (Cl. 209—82)

This invention relates to a gaging apparatus and more particularly to an apparatus for sequentially gaging similar parts from a plurality of separate sources.

It is an object of this invention to provide an apparatus for continuous gaging of parts from a plurality of separate sources by means of a single gaging station and for producing a signal indicative of the particular source of each part as it is gaged.

It is a further object to provide such an apparatus for receiving and gaging similar parts as produced by a plurality of continuously operable forming means each cyclically producing parts, and automatically placing the gaging station in operative relationship with the particular forming means which produced each part as the part is gaged.

It is a further object to provide such an apparatus for rapidly gaging bearing races and the like wherein races are received from a plurality of separate sources in a predetermined relationship and are maintained in that relationship as they pass to a conveyor for sequential feeding through a gaging station, whereby each gaged race can be coordinated and identified with its particular source.

It is a further object to provide such an apparatus wherein races or the like received from a plurality of separate sources are maintained in segregated relationship and are periodically and simultaneously loaded in a predetermined order, one race from each source, onto a conveyor for sequential movement in that same order through a gaging station, whereby the gaging results obtained can be coordinated and identified with the particular source of each race for operator information, part selection and machine control as desired.

It is a further object to provide an apparatus for gaging the disposition of a continuous groove about the axis of an annular part such as the raceway of a bearing race, wherein an end face of the race is located in a reference plane and a gaging means responsive to the displacements between the end face and raceway location is relatively moved along the raceway for gaging.

It is a further object to provide such an apparatus wherein the end face is engaged to move the race axially into a gaging station following which the race or the like is rotated and a follower, free for movement along the race axis, follows the raceway and controls gaging means responsive to raceway-to-face location, raceway runout, and like characteristics.

It is a further object to provide such an apparatus for rapidly and accurately gaging bearing components and the like, wherein characteristics such as raceway location, bearing diameter and the like are measured in a gaging station which sequentially receives races as continuously produced by a plurality of forming means, the gaging station being placed in operative relationship with the particular forming means which produced each race as the race is gaged for machine control, means being provided for segregating the races following gaging in accordance with the gaged characteristics.

Other objects and advantages of the invention will be apparent from the following description, the appended claims and the accompanying drawing, in which, Figure 1 is a plan view of an apparatus embodying the present invention, Figure 2 is a fragmentary view taken on line 2—2 of Figure 1 illustrating a portion of the escapement mechanism for loading races from the receiving means into the conveyor, Figure 3 is a view in elevation of a portion of the apparatus of Figure 1 illustrating primarily a continuous conveyor, Figure 4 is a sectional view on line 4—4 of Figure 1 disclosing a portion of the indexing drive for the continuous conveyor and the index table which actuates switches involved in the control circuit of the apparatus, Figure 5 shows the association of the index table and switches, Figure 6 is a detail of a portion of the assembly of Figure 5 taken on line 6—6, Figure 7 is taken on line 7—7 of Figure 1 and illustrates a portion of the supply means provided for carrying parts from the continuous conveyor to the gaging station and the segregating mechanism for segregating the races following gaging, but omitting details of the gaging station itself, Figure 8 is a view on line 8—8 of Figure 7, Figure 9 is a sectional view of a segregating gate as seen on line 9—9 of Figure 7, Figure 10 is a sectional view on line 10—10 of Figure 7, Figure 11 is a sectional view on line 11—11 of Figure 1, Figure 12 illustrates in a fragmentary perspective view one of the receiving chutes, the escapement bar and the position of a part when located in the continuous conveyor, Figure 13 is a diagrammatic representation illustrating the principle involved in receiving parts from a number of sources and maintaining them in a predetermined order for supply to the gaging station, Figure 14 is a perspective detail of a portion of the apparatus, Figure 15 is a sectional view on line 15—15 of Figure 1 along the center line of the gaging station.

Figure 16 is a fragmentary section on line 16—16 of Figure 5,

Figure 17 illustrates a bearing race and indicates the dimensions gaged by the particular disclosed gaging station, Figure 18 is an enlargement of a portion of the section of Figure 15, Figure 19 is a fragmentary view illustrating a detail of the gaging apparatus, Figure 20 is a diagrammatic representation of the flow of the parts through the apparatus, Figure 21 is a view of the air actuating system involved in the operation of the apparatus, Figure 22 is the air gaging circuit for gaging the race characteristics, Figures 23A, 23B and 23C illustrate the electrical control circuit, Figure 24 is an exemplary circuit which can be utilized at a machine tool or the like for control thereof, Figures 25 to 29 are charts indicating switch conditions in the electrical control circuit, and Figure 30 is a timing diagram.

It will be apparent that the present invention can be embodied in other and materially different apparatuses and applied to the gaging of other characteristics of different parts, but the illustrated apparatus is provided for gaging bearing races or the like as produced by a number of continuously operable grinding machines. The apparatus receives the races as they are ground and sequentially feeds them through a single gaging station which is placed in control relationship with the particular machine which produced each particular part as the part is gaged. The gaging station also controls segregating mechanism for segregating the races in accordance with their gaged characteristics.

Figure 20 illustrates diagrammatically the general organization of the illustrative apparatus. Twelve grinders represented by numerals 1 to 12, of conventional construction, normally operate in a continuous cyclic manner to produce races which are carried to receiving chutes 30 provided, one for each machine, to receive and maintain the races in segregated relationship. From the receiving chutes a group of races, one from each machine is periodically loaded into a conveyor which carries the races in sequence to a gaging station indicated at 31 where, in this particular example, the races are gaged for raceway location, raceway-to-face runout, and outside diameter. As each group of twelve races is conveyed beyond chutes 30 another group is loaded into the conveying means. A control system 32 utilizing electric signal devices and air actuating means is responsive to the gaging at the gaging station and actuates a segregating mechanism at 34 to segregate the races in accordance with their gaged characteristics. Through an interconnection 35 the control system 32 is placed in control relationship with the particular machine which produced each part as that part is gaged. This connection 35 can be utilized, for example, to stop any machine which produces a predetermined number of consecutive parts which are out of tolerance on either raceway location or race runout as here applied.

The operation of the receiving and supply means for carrying the races to the gaging station in a predetermined sequence will be apparent from an examination of the diagrammatic showing of Figure 13. In that figure the grinding machines are again represented by numerals 1 through 12 and receiving chutes 30 receive the races from the machines. For illustrative purposes it is assumed that machines 5 and 10 have been closed down as being out of adjustment and having produced a given number of consecutive reject parts.

In the illustrated condition of the apparatus of Figure 13 an escapement or gate bar 40 has just been actuated to release a race from each of the receiving chutes into the pockets of a continuous conveyor 41 which is sequentially stepped along. The races are disposed in the conveyor in the same order as they are maintained in the supply chute connected to the grinding machines. As the conveyor 41 is sequentially stepped along the races are maintained in their predetermined relationship and carried to a position for engagement by fingers of a transfer bar 42 which is periodically actuated to remove each race from the conveyor 41 and carry it transversely to a position in the gaging station. An index table 44 is rotated in timed relationship with the movement of the conveyor and actuating fingers 45 carried thereby control switches in an air-electric control system to be later described in detail to provide a signal and place the gaging station in control relationship with the particular grinder which produced the part then being gaged. For example, in Figure 13 a part from grinder 4 is in gaging position and at that time the apparatus will be in control relationship with grinder number 4. After the conveyor 41 has indexed 12 steps from the position shown in Figure 13 the escapement bar 40 will again be actuated to release races into the conveyor.

As the races are received in the inclined receiving chutes 30 they are held against further downward movement by an escapement bar or gate 40. Note in particular Figures 1, 2 and 12. This bar can be quickly rotated partially from its position as seen in Figures 2 and 12 by means of a solenoid 342 connected to linkage 48 and acting against the bias of spring 47 to rotate the lower flat portion of the bar approximately 45 degrees releasing the row of races then engaging the bar but preventing other races in the chutes from moving through the escapement. When the bar 40 is so rotated linkage 48 carries a pin 49 into position for engagement by a latch 50. Latch 50 is released upon energization of solenoid 343 and bar 40 immediately rocks to its former position maintaining the races in the receiving chutes. In this manner a number of races, one from each of the machines, are periodically loaded into the continuous conveyor of the supply means. The floor 51 of supply chutes 30 terminates just beyond the escapement bar 40 but the chute walls continue over the conveyor to maintain the races in the proper position for dropping into the conveyor when they are released by the escapement.

Conveyor 41 forms a portion of the means for supplying the races from the receiving chutes to the gaging station. This portion of the supply means is particularly illustrated in Figures 3 to 5 and 12. The conveyor provides a continuous series of race receiving pockets formed by partitions 54 linked together. Conveyor 41 is supported by sprocket wheels at each end of the apparatus the shafts of which are indicated at 55 and 56 in Figure 3. Conveyor 41 is indexed along as index table 44 is rotated by an index unit 57 of a commercially available type the details of which form no critical portion of the present invention and which is not illustrated in particular detail. In such a unit (note Fig. 21) when air is applied to cylinder 58 to move piston 59 to the left shaft 55 is partially rotated to move the conveyor and the index wheel 44. When air is supplied to cylinder 60 to move piston 61 inward the index drive is reset for subsequent indexing.

The races are maintained laterally between partitions 54 by side walls 64 and 65 until they are in line with opening 66 in wall 65 as seen in Figure 3. Following this each race is sequentially moved transversely from the continuous conveyor 41 by transfer fingers into the gaging station.

The switches illustrated in Figures 4, 5 and 6 are associated with an electrical circuit to be later described in detail. Switches 301 through 312 are provided, one for each of the grinders, and as table 44 is indexed in timed relationship with the conveyor and other transfer mechanism the switch corresponding to the machine which produced the part then being gaged is actuated by a cam surface 68 provided along the periphery of the wheel. Switch 246 is actuated momentarily by each of the pins 45 near the end of each index movement of the conveyor and table 44 for purposes later described with respect to the electrical diagram.

The supply means between the receiving chutes and the gaging station further comprises a transfer bar 42 (note Figs. 1, 7, 8, 10, 11 and 12) which is axially slidable and rotatable and carries transfer fingers 71, 72 and 73. Fingers 71, 72 and 73 are attached to the upper surface of transfer bar 42 and extend to one side thereof and downward between side walls 75 and 76. These fingers operate to first remove a race from between partitions 54 in conveyor 41 to an intermediate position 77 as indicated in phantom in Figure 7 and then in a second step to the center line 78 of the gaging station for gaging. Bar 42 is supported between roller pairs 80 and 81 for axially sliding and for rotation. It is rotatable within a connecting member 84 actuated by means of rod 87 connected to a piston within cylinder 85 to move the bar longitudinally. A projection 90 at the rear end of bar 42 strikes the roller of switch unit 322 when retracted and the roller of switch unit of 227 when advanced.

A cylindrical rod 91 fixed to bar 42 by arms 92 and 93 is slidable within a yoke 96. Yoke 96 is in turn connected through a connecting rod 97 to a piston within cylinder 99 to rock bar 42 and raise or lower the feed finger. Rod 97 carries a projection 100 (see Fig. 11)

which actuates switch 244 when the rod is retracted, and switch 226 when the rod is extended. Through means of the air-electrical system to be later described the piston within cylinder 85 is energized and rod 87 is extended to move the transfer bar 42 forward and remove a race from the conveyor 41 in between side walls 75 and 76 while simultaneously carrying a race into alignment with the center line 78 of the gaging station. Following this the piston within cylinder 99 is actuated to extend rod 97 and rock arms 92 and 93 to raise transfer fingers 71 to 73 to clear the races. Bar 42 is then retracted and fingers 71 to 73 are lowered through retraction or rod 97. The actuation of transfer fingers 71, 72 and 73 in timed relationship with the indexing of continuous conveyor 41 serves to move races transversely from the conveyor and carry them in a stepped sequence to the station for gaging. Finger 73 during the actuation serves to remove the previously gaged race from the station and carry into position for movement along the selection trap doors to be later described.

The particular race characteristics gaged in this exemplary application are diagrammatically shown in Figure 17. The gaging station will now be described with particular reference to Figures 15 to 18 and 22. After a race is transferred into alignment with the gaging station it is moved axially into the station and is rotated as a gaging roller follows the curvature of the raceway relative to a reference end face of the race. The outside diameter is simultaneously gaged. As a first step in the gaging operation the piston within cylinder 110 is extended and through coupling 111 shaft 112 is moved to the left as viewed in Figure 15 to carry a driving locator 114 into engagement with the adjacent reference face of the race to move the race axially to the left into the gauging station against a spring biased sleeve 115 which can rock and maintains the race in engagement with the face of locator 114 with its reference end face in a plane perpendicular to the axis of shaft 112. At this point spindle 116 is in a position 180 degrees from that of the drawing. Spindle 116 has its axis parallel to but above that of shaft 112 and when in that position a gaging roller 120 is in a lower position offering clearance for the movement of the race into gaging position. The movement of shaft 112 to the left is limited by the engagement of a carbide insert 122 with a carbide ball 124 at the adjacent faces of shaft 112 and spindle 116 respectively. Accordingly the reference face of the race is located in a predetermined plane and a predetermined axial location within the station.

At this point rack 125 which meshes with pinion 136 on spindle 116 (note Fig. 19) is actuated to rotate spindle 116 180 degrees to carry the gaging roller 120 upward into the raceway in a position as it appears on the drawing. Rack 125 is moved by a piston within cylinder 130 and a flange 131 connected to rack 135 actuates switch 323 when the rack is lowered and switch 236 when the rack is raised. Stop 135 serves to limit the upward extension of rack 125.

A clamp indicated at 140 includes a clamping roller 141 which is resiliently urged downward during gaging through a piston rod 145 acting against spring 146. Rod 145 is actuated by a piston within cylinder 150 for clamping and, if a race is not in position in the gaging station, rod 145 will extend to the fullest and stop 151 will actuate switch 240.

After the race has been positioned in the gaging station, spindle 116 rotates to carry roller 120 upward, and clamp 140 has been actuated; a rack 160 engaging an extended toothed portion 161 of shaft 112 is moved downward by means of a piston within cylinder 162 to rotate shaft 112 and to rotate the bearing within the station. Rack 160 has a collar 179 attached thereto which actuates switch 250 in its lower position and switch 320 in its upward position. As rack 160 moves downward it momentarily actuates switch 248 to energize the gaging system. Note Figure 14.

Gaging roller 120 is free for axial movement to follow the bearing raceway and cooperates with an orifice 170 to control the leakage of air under pressure supplied through a longitudinal passage 171 in spindle 116. Simultaneously air leakage gaging cartridges 175 and 176 have their work contactors 177 and 178 in engagement with the diametrically opposite points on the outer surface of the race for diameter gaging. Thus as the race is rotated roller 120 follows the disposition of the raceway relative to the reference end face of the race and controls the air leakage for gaging raceway location and runout as the gaging cartridges 175 and 176 simultaneously gage the race diameter. Cartridges 175 and 176 are of conventional construction wherein a work contacting plunger controls the leakage through an orifice situated in the cartridge body. These cartridges can be of a construction, for example, as shown in Patent Number 2,691,827, issued October 19, 1954.

Figure 22 illustrates the gaging circuit. Air under pressure is supplied to a manifold 180. For gaging raceway location and run-out the system along the lefthand portion of Figure 22 is provided. Air passes through pressure regulator 181, a pressure indicator 182, and an adjustable restrictor 183. The pressure in the system beyond the variable restrictor 183 will be controlled by the proximity of the end face of gaging roller 120 to leakage orifice 170 to control the leakage through the orifice. A pressure indicator 184 is provided for use during setup and a valve 185 is used to remove this unit from the circuit during gaging to decrease the volume involved and speed up the gaging reaction. As will be seen from Figure 17 raceway runout is the difference in the extreme axial disposition of the raceway along its curvature. As the roller 120 follows the raceway curvature maximum and minimum pressure differences in the lefthand circuit will be obtained as the roller axially slides to follow the rotating raceway and a variation head 264 which can be of a construction such as that disclosed in application Number 437,680, filed June 18, 1954, is set to respond at a predetermined pressure variation at the limit of permissible runout to actuate a switch contained therein and included in the circuit of Figures 23A, 23B and 23C. The unit 264 (as shown in the application referred to) contains a diaphragm subjected on both sides to the gaging pressures. The maximum pressure obtained during each gaging operation is trapped on one side of the diaphragm while the other side is subjected to full variation. At a predetermined variation and diaphragm deflection switch contacts of the unit are actuated.

The raceway location relative to the reference face of the race also has permissible tolerance limits between the minimum allowable displacement from the end face and a maximum allowable displacement from the face. A gaging head 260 of the character disclosed in Patent Number 2,448,653, issued September 7, 1948, contains two pairs of switches 260A and 260B actuated by an arm carried by pressure responsive Bourdon tube 190. As the race is rotated if the variation in its location is within these limits the arm maintains an intermediate position and both switch sets are closed. If the race location is beyond one extreme limit switch 260A is opened as the arm swings in that direction and if the location is beyond the other limit switch 260B is opened with a movement of the arm to the right as viewed in Figure 22.

Through use of the gaging units 260 and 264 raceway-to-face runout and raceway location are both gaged and electrical signals are obtained for use in the electrical circuit to be later described.

Air from manifold 180 is supplied for diameter gaging through a regulator 191 and variations in leakage through cartridges 175 and 176 responsive to the movements of the work controlled plungers determines the pressure condition in this system beyond variable restriction 192. This pressure is applied to a gaging unit 280 similar to unit 260 to obtain opening and closing of switches 280A and 280B contained in unit 280. Thus electrical signals are obtained responsive to the diameter of the race gaged.

After a race has been gaged spindle 116 is rotated 180 degrees and clamp 140 is lifted to free the race. Shaft 112 is retracted and sleeve 115 moves to its outward limit to remove the race from the gaging station. Following this the race is engaged by feed finger 73 and carried forward into a selection chute which has three trap doors in the floor thereof. The trap doors are selectively opened in response to the gaging to remove and segregate races which are beyond the various tolerances.

If the raceway location is improper, trap door 194 is moved to the right against a spring bias by solenoid 339 to allow the race to drop through into lower chute 197. If raceway-to-face run-out is beyond that permissible solenoid 340 is energized to open trap door 195 allowing the race to drop into chute 198 and if the outside diameter is beyond permissible tolerances solenoid 341 is energized, trap door 196 opens, and the race falls into chute 199. If all of these conditions are within the permissible tolerances the race continues its movement down chute 193.

Figure 30 is an exemplary timing diagram showing the timed relation between the various movements.

The operation of the apparatus will now be described with particular reference to the electrical circuit of Figures 23A, 23B and 23C and the air diagram of Figure 21. Relays have been given numeral designations and switches actuated thereby are designated by the same numerals with letter suffixes. Where a switch unit includes a plurality of switch contacts the various contacts have been designated with a common numeral and letter suffixes. The charts of Figures 25 to 29 disclose various conditions for the switches within gaging units 264, 260, 280 and rotary switches 210 and 211 respectively. For example, in the chart of Figure 25 if the race-way-to-face run-out is within satisfactory conditions and "OK" switch 264 is closed as indicated by the letter X. If the condition warrants a reject the switch is open as indicated by the letter O. Various switches actuated by mechanical components in the apparatus previously described are indicated in the electrical circuit with the same numerals.

At the beginning of the operational sequence feed fingers 71, 72 and 73 are down, transfer bar 42 and cross feed shaft 112 are returned and clamp 140 is released. Rack 125 is down and rack 160 is up. Reject trap doors 194, 195 and 196 are closed.

Switch 202 must be closed to the main line leads. Switch 211 is adjusted to "gage" opening switch contacts 211A and 211B. (See Figure 28.) Switch 210 is rotated to the "auto" position (Figure 29) for automatic operation and contacts 210A open and contacts 210B and 210C close. Master start push button 200 is then depressed closing its contacts and completing a circuit to relay 205 and light 204 indicates that power is on. Relay operated switch 205A closes in a holding circuit around master start switch 200 and switches 205B and 205C close to furnish power to the relay and solenoid circuits respectively. Switch 212A is normally closed and a circuit is completed through switch 210C to relay 208. Light 206 is then lit. Relay 208 closes switches 208A, B, C, D and E and opens switch 208F to condition the circuit for the cycle. When the cross feed shaft 112 is in the return position, switch 221 is engaged closing switch 221A to relay 224 closing switches 224A and C and opening switch 224B.

Depression of cycle start button 216 closes its associated contacts and light 217 indicates that the cycle has commenced. Relay 218 is energized closing switch 218A to complete a holding circuit around switch 216 which is depressed momentarily and released. Switches 218B–E also close and switches 218F and G open. Switch 226 is closed when the feed fingers are in down position. Thus the closing of switch 218B energizes relay 228. Relay 228 closes switch 228A to solenoid 325 actuating valve 400 in the air circuit of Figure 21 to start the transfer 42 forward. Switch 228B is also closed.

When the transfer bar 42 reaches its forward position switch 227 is engaged and closed energizing relay 230. Transfer bar 42 almost immediately returns as later described. Energization of relay 230 closes switches 230A–E. Switch 230C closes to energize solenoid 326, actuating valve 401 and starting the cross feed shaft 112 forward. When shaft 112 leaves its inward position switch 221B closes and switch 221A opens, deenergizing relay 224.

Closing of switch 230A completes a circuit to a timer 234 of a commercially available type which immediately closes switch 234A in a second circuit to the timer. The timer operates with a time delay to open switch 234B and close switch 234C. If spindle 116 rotates fully and cross feed shaft 112 moves all the way in, switch 237B is actuated to open contacts and switch 236 is actuated to open contacts 236A and the timer is taken out of the circuit. If a jam condition exists one of these switches will remain closed and if they are not opened before the timer times out light 239 is lit indicating a jammed condition as 234B is opened in the parallel line to resistance 238 and 234C is closed to by-pass switch 237A (switch 237A being closed and switch 237B being opened only when the crossfeed is fully forward) and condition the circuit to continue the cycle even though these components do not complete their forward movement. Due to the resiliency of the air operated cylinders this operation is possible without damage to the apparatus.

When switch 230B is closed it energizes relay 247 closing switches 247B and C and opening switch 247A. Switch 247A opens in the circuit to the transfer forward relay 228 and this circuit only closes if switch 246 operated by index table 44 has been momentarily opened breaking the circuit to relay 247. Switch 246 is opened near the end of each index. This insures that the transfer cannot move forward again until the conveyor has indexed forward. Switch 247B closes in a holding circuit to relay 247 and switch 247C closes so that when switch 256D closes as later described solenoid 334 is energized to actuate valve 412 to move piston 259 to the right as viewed in Figure 21 and to index table 44, moving conveyor 41 along.

During each gaging cycle when relay 230 is energized switch 230E closes to solenoid 343 to actuate and release latch 50 to allow the escapement gate 40 to close if it has been rotated and latched open on the previous cycle through energization of solenoid 342.

Switch 230D energizes solenoid 327, actuating valve 405 to raise feed fingers 71, 72 and 73. When the feed fingers reach their upward position switch 244 is actuated and closed energizing relay 245, opening switch 245A to relay 230 and closing switch 245B and C. Closing switch 245B to relay 275 in turn opens switch 275A and closes switches 275B and 275C. Switch 245C closes to solenoid 328 actuating valve 400 in the reverse direction and starting the return of transfer bar 42. When the transfer reaches its return position switch 322 is actuated energizing solenoid 333, moving valve 405 to lower the feed fingers through forward movement of rod 97.

When the cross feed is in the forward position having carried a race into gaging position within the gaging station, switch 237A closes to energize solenoid 331 and actuate valve 407 to start movement of the part rotation rack 160 downward. When the rack 160 for driving race rotation shaft 112 is in its upper position, switches 320 and 250 are closed and switch 248 is open. Solenoid 332 is energized to actuate valve 408, move rack 125 upward and rotate spindle 116 to carry the gaging roller 120 into its upward position into the raceway. Solenoid 329 actuates valve 410 to move the clamp rod 145 downward. When the cross feed shaft 112 reaches its forward position switch 237B is open. When the spindle 116 has been rotated to carry roller 141 upward flange 131 on rack 125 strikes switch 236 opening the switch.

Race rotating rack 160 moves downward driving shaft 112 to rotate the race within the gaging station. At the midpoint in this movement switch 248 is closed to initiate gaging by energizing relays 254 and 256. Light 252 goes on indicating that gaging is taking place. Relay 254 closes switches 254A–D and opens switches 254E and 254F while relay 256 closes switches 256A–D to set up the gaging circuit. Relay 249 is also energized to set up the gaging relay holding circuit, closing switches 249 A to E and opening switches 249F to H.

The selection trap doors 194, 195 and 196 are actuated by commercially available solenoid units 339, 340 and 341, respectively. Each solenoid unit is of a type which, when energized, will draw the respective trap door outward and latch it in that position. Relays 295' and 296' and 297' unlatch and release the trap doors and these relays are energized when switch 256C is closed to insure that during gaging all the trap doors are in their closed positions. Switch 256D when energized actuates solenoid 334 to index the table 44 moving conveyor 41 one step.

Near the end of the downward movement of part rotating rack 160 switch 250 is actuated and opened to deenergize relays 254 and 256 to end gaging, light 257 then going out. When switch 254E closes relay 258 is energized, opening switches 258A–C and closing 258D–H, to end the gaging, lower rack 125, and start the rotation of spindle 116 to lower the roller 141 and clear the raceway. Switch 258E is closed in the circuit to the latching relays to open a reject trap door if a reject condition has been set up as later described in detail. Switch 258G energizes solenoids 335 and 337 to lower rack 125 through actuation of valve 408 and to release clamp 140 through valve 410. When the rack 125 reaches its downward limit switch 323 is opened to feed finger down solenoid 333. Switch 236 B closes thus energizing solenoid 338 to actuate valve 401 and move the cross feed shaft 112 outward while energizing solenoid 336 to actuate valve 412 in the reverse direction moving piston 61 inward to reset the table for indexing. When the cross feed shaft 112 returns switch 221A is closed to energize relay 224 to initiate the next cycle, opening switch 224D and closing switches 224A and C. Switch 224C energizes solenoid 330 to move the part rotating rack 160 upward and switch 224B opens.

For every twelve cycles switch 309 will be closed energizing relay 316 to close switches 316A and B and open switch 316C which is normally closed. When relay 224 is energized upon cross feed return on the twelfth cycle, it closes switch 224A which in turn energizes relay 228 to close switch 228B, thus completing a circuit through switch 316B to solenoid 342 to draw connection 48 downward and rock the escapement bar 40 to release a race from each receiving chute into the conveyor.

If no part is in position within the gaging station switch 240 closes to relay 242 which in turn closes switch 242A and opens switches 242B and C, disabling the gaging and machine control circuits. With switch 210 on "single" position the switch contacts are in the condition indicated in Figure 29 and the various movements described previously occur as outlined above but when relay 258 is energized at the end of the cycle the "cycle start" button 216 must be momentarily operated for another cycle because relay 218 is deenergized and no further movement is otherwise possible. When switch 210 is on "manual" relay 228 is not energized and movements are initiated only by operation of the various push buttons provided.

With switch 211 on "set-up" relay 228 is not energized and movements are initiated by manual operation of the push buttons while the trap doors do not open.

Various push buttons are provided for manual control. Their operation will be understood in view of the previous description. Button 201 when depressed acts as a "master stop" deenergizing master relay 205. When button 213 is depressed the cross feed is returned. Button 214 actuates its associated switch contacts to return the transfer and the cycle can be stopped whenever desired by depression of button 215 breaking the circuit to relay 218. The cross feed is moved forward when switch 229 is actuated to close the circuit to relay 230. In Figure 23C push button 350 is provided to rotate the part with the rack moving down and 321 serves to move the rack upward for driving shaft 112. When button 425 is depressed the feed fingers are moved up.

Gaging takes place during the cycle as follows. If raceway location is OK switches 260A and 260B are both closed and relays 267 and 268 are energized to close switches 267A and 268A and to open switches 267B and C and 268B and C. Lights 266 and 271 go out. With switches 267C and 268C both open the race location reject relay 290 is disabled. If the race location is beyond the minimum switch 260B closes, light 271 goes out to relay 267, closing switch 267A and opening switches 267B and C. Light 271 goes out. Similarly if the race location is beyond the maximum permissible switch 260A, 260B closes energizing relay 268 thus closing switches 268A and opening switches 268B and C. In this case light 266 will go out. In either case of a reject for raceway location a circuit is completed to relay 290 closing switches 290A and 290C and opening switch 290B. This energizes latching relay 295, actuating switch 295A to energize solenoid 339 and open the race location trap door 194 and latch it open. Switch 290B opens to disable the other trap door latching relays. Switch 290C provides a signal for machine control as will be later described.

If raceway to face runout is within satisfactory limits switch 264 remains closed to relay 275 through holding switch 275B. Relay 276 remains energized with holding switch 276A closed and switch 276B opened to disable reject relay 291. With an out of tolerance condition contacts 264 open, relays 275 and 276 are deenergized and switch 276B closes.

If switch 276B is closed relay 291 is energized to close switch 291A leading to latching relay 296. Relay 296 when energized closes switch 296A to solenoid 340 to open and latch raceway to face run-out reject trap door 195. Switch 291B is opened to disable the diameter reject latching relay 297 and switch 291C provides a machine control signal.

In gaging the outside diameter of the race if the race diameter is within satisfactory limits switch contacts 280A and 280B are closed and relays 285 and 286 are energized to close switches 285A and 286A while opening switches 285B and C and 286B and C. Lights 284 and 287 then go out and both switches to the outside diameter reject relay 294 are open. If the diameter is beyond the maximum permissible switch 280B closes and light 287 goes out. Relay 294 is then energized, switch 294A closes and relay 297 actuates switch 297A to close the circuit to solenoid 341 opening and latching diameter reject trap door 196. For a race beyond the minimum switch 280A closes and light 284 goes out and the trap door similarly opened.

Provision is made for a feed-back signal to each of the twelve grinders producing the races gaged. In the particular example illustrated reject parts on raceway location and run-out produce a signal which is fed back to the particular grinder which produced the race then being gaged. Through provision of a counter at each grinder the grinder can be automatically stopped after a predetermined number of consecutive reject races have been produced thereby. Switches 301 to 312 provided, one for each of the respective grinders, are associated with the peripheral cam surface 68 of the index table 44 so that they are actuated in timed relationship with the movements of the conveyor and transfer mechanism, thus the switch contacts 301 to 312 in the diagram of Figure 23B are all open during gaging except for that particular switch associated with the grinder which produced the part then being gaged and which has its controlling roller engaging cam surface 68. In case of a reject due to improper raceway location, when relay 290 is energized switch 290C is closed to a grinder control relay 315 which has switch contacts in each of the grinder circuits as designated. Similarly if a reject condition exists because of a raceway to face run-out being beyond tolerable limits relay 291 is energized and switch 291C is closed to relay 315.

An exemplary circuit is illustrated in Figure 24 for application at each particular grinder. In the example shown the circuit is tied into the circuit including switch 301 for grinder number 1 through lines 415 and 416. A commercially available counter 419 is included in the circuit. When a part produced by this machine is gaged cam actuated switch 301 is closed. If a reject part has been produced relay 315 is energized, as previously described, opening the lower of switch contacts 315A and closing the upper. Line 415 is thus energized to the counter 419 and a count is made. The counter can be adjusted for any predetermined number of consecutive rejects and when this number is reached the counter opens switch 419A to the counter and closes switch 419B to a signal light 420. A relay can of course be substituted for the signal light 420 to control the power supply to the grinder and stop the grinder, if desired. When a satisfactory part produced by that machine is gaged switch 315A maintains a position as illustrated in Figure 23B and line 416 is energized to reset the counter. If at anytime manual resetting is desired switch 417 is depressed.

Thus it is seen that an apparatus has been produced for the continuous gaging of similar parts produced by a plurality of different sources. The parts are fed through the gaging station in a predetermined sequential order and the signal is provided indicative of the particular source which produced the part then being gaged. Through the electrical circuit provided a number of machines can be controlled. Raceway characteristics such as raceway location and runout are readily gaged through the simple and rugged apparatus of the gaging station of this device. The apparatus is reliable in operation for a prolonged service life in accurate gaging. Costs are reduced through the unique inter-relationships achieved and the elimination of the necessity for individual gages for each of the producing machines.

While the form of apparatus herein described constitutes a preferred embodiment of the invention it is to be understood that the invention is not limited thereto and that changes can be made therein without departing from the scope of the invention which is defined in the appended claims.

What is claimed is:

1. An apparatus for receiving and gaging similar parts from a plurality of separate sources, comprising receiving means for receiving parts from each of the sources, a gaging station including means for gaging a part characteristic, supply means between the receiving means and gaging station for supplying parts for gaging including arranging means having successive stations, each station corresponding to a particular source, means for feeding said stations successively through said gaging station, means for producing a signal when a defective part is gaged, and enabling means operated in timed relation to said arranging means for placing said signal means in operative association with the source of each part gaged.

2. An apparatus for receiving and gaging similar parts as produced by a plurality of continuously operable forming means each cyclically producing parts, said apparatus comprising receiving means for said forming means arranging the parts in a segregated condition and a predetermined order according to the particular forming means, a gaging station for gaging a part characteristic, supply means for supplying parts from the receiving means to the gaging station while maintaining such predetermined order, and signal means associated with said gaging station and said supply means for producing a signal coordinated with the particular forming means which produced the gaged part.

3. An apparatus for receiving and gaging similar parts as produced by a plurality of continuously operable forming means each cyclically producing parts, said apparatus comprising receiving means associated with said forming means for receiving parts produced thereby, a gaging station for gaging a part characteristic, supply means for cyclically and automatically supplying parts from the receiving means to the gaging station in a predetermined order whereby the particular forming means which produced each part is identified as the part is gaged, signal circuits for said forming means, and enabling means for said signal circuits operatively connected to said gaging station and operated in timed relation to said supply means responsive to both the gaged characteristic and the identity of the forming means which produced each part gaged.

4. An apparatus for receiving and gaging similar parts as produced by a plurality of continuously operable forming means each cyclically producing parts, comprising a plurality of receivers, one for receiving and segregating parts produced by each of the forming means, a gaging station for gaging a dimensional characteristic of each part as produced by the corresponding forming means, supply means cooperating between said receivers and said gaging station for sequentially supplying parts for gaging in a predetermined order, gaging means in said gaging station for obtaining responses determined by the gaged characteristic of each part gaged, and conditioning means operated in timed relationship to said supply means for coordinating the gage responses obtained with the particular forming means which produced each gaged part.

5. An apparatus for receiving and gaging similar parts as produced by a plurality of continuously operable forming means each cyclically producing parts, said apparatus comprising a series of separate receivers, one for each of the forming means, conveyor means associated with said receivers, loading means for simultaneously loading a part from each of said receivers into said conveyor means in an order determined by the relative disposition of the receivers, a gaging station for sequentially receiving parts from the conveyor means, and means associated with said gaging station and said conveyor means for producing a signal as each part is gaged which selects the particular forming means that produced the part gaged.

6. An apparatus for receiving and gaging similar parts from a plurality of separate controllable sources each normally producing parts in a continuous cyclic manner, comprising separate receiving means for receiving parts from each of said sources, a gaging station including means for gaging a part characteristic, supply means between the receiving means and gaging station for supplying parts for gaging in an order determined by the relationship between the receiving means, and control means adapted for connection to the controllable sources, said control means including a first means responsive to said gaging means and the gaged part characteristic and conditioning means placing said first means in operative association with the controllable source which produced the part as each particular part is gaged.

7. An apparatus for receiving and gaging similar parts as produced by a plurality of continuously operable forming means each cyclically producing parts, said apparatus comprising a plurality of receivers, one for receiving parts produced by each of the forming means, means mounting said receivers in adjacent relationship, supply means including a conveyor extending along said receivers, said conveyor including part receiving means for a relative spacing similar to that of the receivers with which they cooperate, means for driving the conveyor in repeated steps each equalling the relative spacing between adjacent receivers, loading means for simultaneously loading a part from each of the receivers onto the conveyor receiving means in an order determined by the relative disposition of the receivers, a gaging station for receiving and gaging the parts in the order maintained by the supply means, means operated in timed relation to said conveyor drive for actuating said loading means to load an ordered group of parts onto the conveyor as the conveyor movement carries previously loaded parts beyond the receivers, and means responsive to the conveyor drive means for conditioning the apparatus in accordance with the forming means which produced each particular part as the part is gaged.

8. An apparatus for receiving and gaging similar parts as produced by a plurality of continuously operable forming means each cyclically producing parts, comprising a plurality of receiving and segregating chutes, one for receiving parts produced by each of the forming means, means mounting said chutes with their outlets in adjacent relationship, a gaging station, supply means cooperating between said chutes and said gaging station including a conveyor extending across the chute outlets, said conveyor including part receiving means with a relative spacing similar to that of the chute outlets with which they cooperate, means for driving said conveyor in repeated steps each equalling the relative spacing between adjacent chutes, loading means for simultaneously loading a part from each of the chutes onto the conveyor in an order determined by the relative disposition of the chutes, means in said gaging station for gaging the parts in the order maintained by the supply means, means operated in timed relation to movement of said conveyor for actuating said loading means to load an ordered group of parts onto the conveyor as conveyor movement carries previously loaded parts beyond the chutes, said conditioning means responsive to movement of parts through the apparatus for conditioning the apparatus in accordance with the forming means which produced each part as the part is gaged.

9. An apparatus for receiving and gaging the disposition of grooves about the axes of similar parts from a plurality of separate sources, comprising receiving means for receiving parts from each of the sources, a gaging station including means for rotating a part for gaging, follower means for engagement with the groove of the part and gaging means responsive thereto, supply means between the receiving means and gaging station for sequentially supplying parts for gaging in a predetermined order, and means responsive to the gaging means and supply means for obtaining responses determined by the groove disposition of each gaged part and the source of the part.

10. An apparatus for receiving and gaging bearing raceways as produced by a plurality of raceway grinders each cyclically operating, comprising a plurality of receivers, one for receiving and segregating races produced by each of the grinders, a gaging station for gaging the bearing raceway, supply means cooperating between said receivers and said gaging station including a conveyor loading means at said receivers for simultaneously loading a race from each receiver onto said conveyor in an ordered row, drive means connected to said conveyor for sequentially advancing races to said station in line and in the order as loaded for gaging, drive means in said gaging station for locating engagement with a reference end face of a race and to rotate the race about its axis, follower means for engagement with the bearing raceway during race rotation, gaging means responsive to movements of said follower including switch means operated in response to predetermined raceway characteristics, and further switch means one for each grinder, operated in timed relation to conveyor movement to actuate the switch for the grinder which produced each race as the race is gaged, and circuit means including said switch means for feeding a signal to each grinder determined by the raceway characteristics of the races produced thereby.

11. An apparatus for receiving and gaging parts from a plurality of separate sources, comprising a single gaging station at a fixed location through which parts from all said sources are fed, supply means for simultaneous association with the plurality of separate sources for automatically feeding available parts from each source to said gaging station, gaging means in said station for measuring a dimensional characteristic of each part as it is automatically fed therethrough, signalling means for each of said sources and enabling means for selectively enabling said signalling means operatively connected to said gaging station responsive both to the gaged characteristic and the identity of the source of the gaged part.

12. An apparatus for receiving and gaging parts from a plurality of separate sources, comprising a single gaging station at a fixed location through which parts from all said sources are fed, supply means for simultaneous association with the plurality of separate sources for automatically feeding available parts from each source to said gaging station, gaging means in said station for measuring a dimensional characteristic of each part as it is automatically fed therethrough, signal means operatively connected to said gaging station responsive both to the gaged characteristic and the identity of the source of the gaged part to provide a signal indicative of the source and gaged characteristic of the gaged part, and segregating means controlled by said gaging means and receiving parts therefrom for segregating parts into at least acceptable and rejected classifications in accordance with the gaged dimensional characteristic.

13. Apparatus for receiving and gaging parts as produced by a plurality of machines, said apparatus comprising a gaging station, feeding means for receiving parts from each of said machines and supplying said parts sequentially to said gaging station, said gaging station including means for gaging each part and providing reject signals for unacceptable parts, and counting means for each of said machines operatively associated with said gaging means responsive to reject signals for parts produced by the respective machine, each counting means including means providing a signal in response to a predetermined consecutive number of reject parts produced by the associated machine.

14. An apparatus for receiving and gaging parts from a plurality of separate sources, comprising a single gaging station at a fixed location through which parts from all said sources are fed, supply means for simultaneous association with the plurality of separate sources for automatically feeding available parts from each source to said gaging station, gaging means in said station for measuring a dimentional characteristic of each part as it is automatically fed therethrough, signalling means for each of said sources, and enabling means for selectively enabling said signalling means operatively connected to said gaging station responsive both to the gaged characteristic and the identity of the source of the gaged part, said enabling means including first electrical signal means responsive to the measured characteristic and second electrical means controlled in response to the identity of the source of the particular gaged part, and an electrical circuit including said first and second electrical means to provide a response determined by both conditions.

15. An apparatus for receiving and gaging parts from a plurality of sources, comprising a gaging station including means for measuring a dimensional characteristic of a part fed thereto, feed means for receiving parts from said sources and feeding said parts to said station in a predetermined order coordinated with the particular sources, an electric circuit associated with each of said sources, enabling means operatively associated with said gaging means and said feed means for selectively enabling said electric circuits in accordance with the dimensional characteristic of a gaged part and its source, and signal means for each circuit for providing a signal in response to a predetermined succession of parts of a given dimensional characteristic from the respective source.

References Cited in the file of this patent

UNITED STATES PATENTS

| | | |
|---|---|---|
| 2,030,237 | Brittain | Feb. 11, 1936 |
| 2,042,257 | Harrison | May 20, 1936 |
| 2,345,931 | Gates | Apr. 4, 1944 |
| 2,408,689 | Seme | Oct. 1, 1946 |
| 2,419,461 | Neff | Apr. 22, 1947 |
| 2,427,152 | Moore | Sept. 9, 1947 |
| 2,443,895 | Day | June 22, 1948 |
| 2,547,719 | Rosser | Apr. 3, 1951 |
| 2,610,843 | Schellentrager | Sept. 16, 1952 |
| 2,648,135 | Gates | Aug. 11, 1953 |
| 2,687,038 | Aller | Aug. 24, 1954 |
| 2,690,620 | Arelt | Oct. 5, 1954 |
| 2,697,879 | Tandler | Dec. 28, 1954 |
| 2,715,950 | Law | Aug. 23, 1955 |
| 2,761,560 | Pomernachi | Sept. 4, 1956 |
| 2,768,482 | Bindszus | Oct. 30, 1956 |
| 2,807,974 | Meyer | Oct. 1, 1957 |
| 2,821,023 | Mims | Jan. 28, 1958 |
| 2,823,787 | Morgan | Feb. 18, 1958 |
| 2,826,819 | Esken | Mar. 18, 1958 |